Patented Dec. 13, 1949

2,490,835

UNITED STATES PATENT OFFICE 2,490,835

BENZHYDRYL BETA HALOALKYL AMINES

George Rieveschl, Jr., and Robert W. Fleming, Grosse Pointe Woods, Mich., assignors to Parke, Davis & Company, Detroit, Mich., a corporation of Michigan No Drawing. Application July 15, 1946, Serial No. 683,775

8 Claims. (Cl. 260—570)

This invention relates to a new class of tertiary amines and to methods for obtaining the same. More specifically, the invention relates to substituted benzhydryl β-haloalkyl amines and their acid addition salts. The free bases of the compounds of the present invention have the formula,

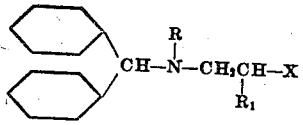

where R is a lower alkyl or lower alkenyl radical, $R_1$ is hydrogen or methyl and X is a chlorine or bromine atom.

It has been discovered that the compounds of the invention may be obtained by the action of a halogenating agent on a compound of the formula,

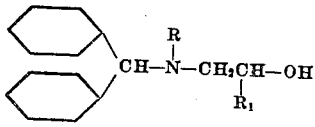

where R and $R_1$ have the same significance as given above. Some of the halogenating agents which may be used to effect this transformation are thionyl chloride, thionyl bromide, constant boiling hydrobromic acid, phosphorus oxychloride, phosphorus oxybromide, phosphorus trichloride, phosphorus tribromide, phosphorus pentachloride and the like. The reaction may be carried out by heating the two reactants for a short time in the presence or absence of a solvent. In some cases, such as when phosphorus oxychloride or constant boiling hydrobromic acid is used as the halogenating agent, an excess of the reagent serves both as a solvent and as a reactant. When halogenating agents such as thionyl chloride and thionyl bromide are used it is preferable to carry out the reaction in an inert organic solvent such as benzene, toluene or xylene.

The compounds of the present invention are powerful sympatholytic agents and because of this ability to block the pressor effect of epinephrine they are especially useful in peripheral vascular diseases and neurogenic hypertension. They may be administered, preferably as the salts of the free bases, either orally or intravenously. The usual intravenous dosage is about 100 to 200 mg. while the oral dosage is about 150 to 300 mg.

The invention is illustrated by the following examples.

*Example 1.—Benzhydryl methly β-chloroethyl amine*

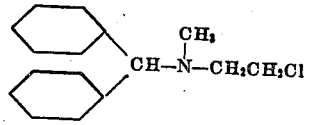

24.1 g. of benzhydryl methyl β-hydroxyethylamine is dissolved in 50 cc. of benzene and the resultant solution added slowly to 13 cc. of thionyl chloride in 50 cc. of benzene. After spontaneous refluxing has ceased the mixture is refluxed for three-quarters of an hour, cooled and diluted with ether. The crystalline hydrochloride of benzhydryl methyl β-chloroethyl amine which separates is collected and purified by recrystallization from isopropanol-methanol mixture; M. P. 190–2° C.

*Example 2.—Benzhydryl ethyl β-chloroethyl amine*

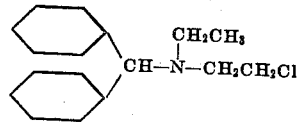

291 g. of benzhydryl ethyl β-hydroxyethyl amine in 250 cc. of benzene is added to a solution of 115 cc. of thionyl chloride in 250 cc. of benzene over a period of twenty minutes. Heat is developed during the addition and the solution refluxes. After spontaneous refluxing has ceased the mixture is refluxed for one hour and then the benzene distilled off in vacuo. The residue is stirred with ether and the crystalline hydrochloride of benzhydryl ethyl β-chloroethyl amine collected. The crude product is purified by recrystallization from acetone-ethyl acetate mixture or from isopropanol-ethyl acetate mixture; M. P. 167–9° C.

*Example 3.—Benzhydryl ethyl β-bromoethyl amine*

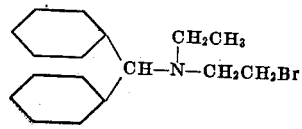

A mixture consisting of 51 g. of benzhydryl ethyl β-hydroxyethyl amine and 650 g. of constant boiling hydrobromic acid is refluxed for one hour. The condenser is set for distillation and most of the hydrobromic acid slowly distilled off. The residue is cooled and acetone added. The crystalline hydrobromide of benzhydryl ethyl β-bromoethyl amine which separates is collected and purified by recrystallization from isopropanol-ethyl acetate mixture.

*Example 4.—Benzhydryl n-propyl β-chloroethyl amine.*

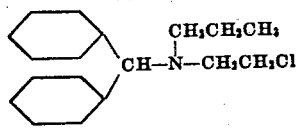

26.8 g. of benzhydryl n-propyl β-hydroxyethyl amine dissolved in 50 cc. of toluene is added slowly to a refluxing solution of 13 cc. of thionyl chloride in 50 cc. of benzene. After the addition is complete the mixture is refluxed for one hour and then approximately one half of the toluene distilled off in vacuo. The distillation residue is treated with ether and the crystalline hydrochloride of benzhydryl n-propyl β-chloroethyl amine removed by filtration. The crude product is purified by recrystallization from acetone-ethyl acetate mixture.

*Example 5.—Benzhydryl iso-propyl β-chloroethyl amine.*

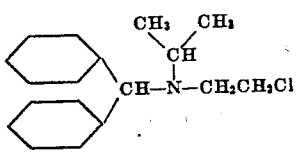

A solution of 53.6 g. of benzhydryl iso-propyl β-hydroxyethyl amine in 100 cc. of benzene is added slowly to a refluxing solution of 26 cc. of thionyl chloride in 100 cc. of benzene and the mixture refluxed for one hour. About one half of the benzene is distilled off in vacuo the residue cooled and treated with several volumes of ether. The crystalline hydrochloride of benzhydryl iso-propyl β-chloroethyl amine is collected and purified by recrystallization from isopropanol-ethyl acetate mixture.

*Example 6.—Benzhydryl allyl β-chloroethyl amine.*

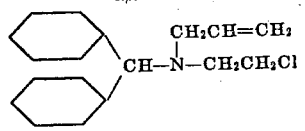

26.7 g. of benzhydryl allyl β-hydroxyethyl amine dissolved in 50 cc. of benzene is added dropwise to a refluxing solution of 13 cc. of thionyl chloride in 50 cc. of benzene. After the addition is complete the mixture is refluxed for one hour and then the benzene distilled off in vacuo. The residue is stirred with ether and the crystalline hydrochloride of benzhydryl allyl β-chloroethyl amine collected and purified by recrystallization from isopropanol-ethyl acetate mixture.

*Example 7.—Benzhydryl n-butyl β-chloroethyl amine.*

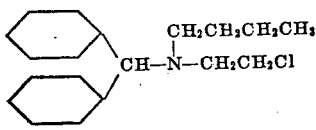

23.8 g. of benzhydryl n-butyl β-hydroxyethyl amine in 50 cc. of benzene is added to a solution of 13 cc. of thionyl chloride in 50 cc. of benzene. After the addition is complete the mixture is warmed for three-quarters of an hour on a steam bath and then the benzene distilled off in vacuo. The residue is stirred with ether, the ether decanted, replaced with fresh ether and the washing is continued until the product crystallizes. The crystalline hydrochloride of benzhydryl n-butyl β-chloroethyl amine is purified by recrystallization from isopropanol-ether mixture; M. P. 170-2° C.

*Example 8.—Benzhydryl n-hexyl β-chloroethyl amine.*

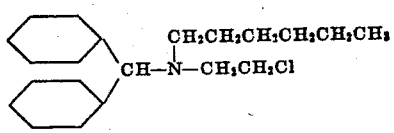

30.5 g. of benzhydryl n-hexyl β-hydroxyethyl amine is dissolved in 50 cc. of benzene and the resulting solution added dropwise to a refluxing solution of 13 cc. of thionyl chloride in 50 cc. of benzene. After the addition is complete the mixture is refluxed for one hour and then the benzene distilled off in vacuo. The residue is stirred with ether until it crystallizes and the crystalline hydrochloride of benzhydryl n-hexyl β-chloroethyl amine collected and purified by recrystallization from isopropanol-ether mixture.

*Example 9.—Benzhydryl methyl β-bromopropyl amine.*

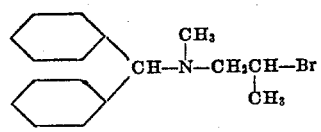

A solution consisting of 25.5 g. of benzhydryl methyl β-hydroxypropyl amine and 650 g. of constant boiling hydrobromic acid is heated for one hour under reflux. The condenser is set for distillation and the hydrobromic acid slowly distilled off until the residue has a volume of about 100 cc. The residue is cooled, diluted with acetone and the crystalline hydrobromide salt of benzhydryl methyl β-bromopropyl amine removed by filtration. The crude product is purified by recrystallization from isopropanol-ethyl acetate mixture.

*Example 10.—Benzhydryl ethyl β-chloropropyl amine*

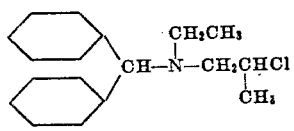

A solution of 26.9 g. of benzhydryl ethyl β-hydroxypropyl amine in 50 cc. of benzene is added dropwise to a refluxing solution of 13 cc. of thionyl chloride in 50 cc. of benzene and after the addition is complete the mixture refluxed for one hour. The benzene is distilled off in vacuo, the residue treated with ether and the crystalline hydrochloride of benzhydryl ethyl β-chloropropyl amine collected and purified by recrystallization from isopropanol-ethyl acetate mixture.